Dec. 4, 1928.

E. WILDHABER

GEARING

Filed March 25, 1924    3 Sheets-Sheet 1

1,694,027

INVENTOR
Ernest Wildhaber

Dec. 4, 1928. 1,694,027
E. WILDHABER
GEARING
Filed March 25, 1924 3 Sheets-Sheet 2
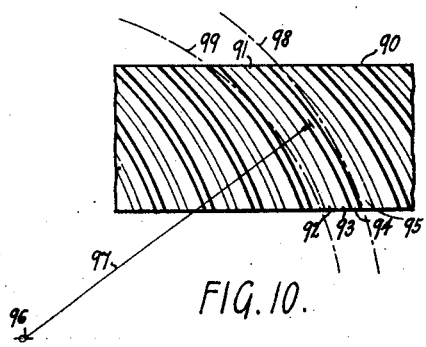
FIG. 10.
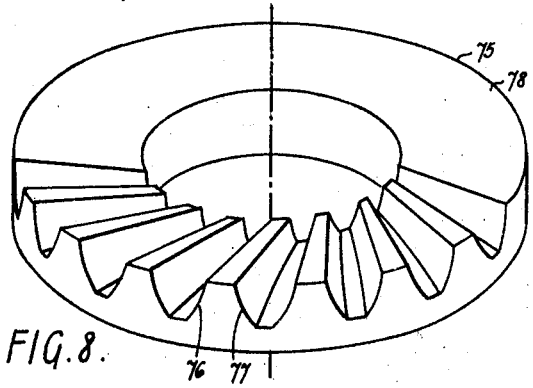
FIG. 8.
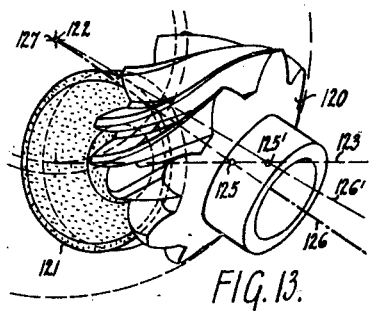
FIG. 13.
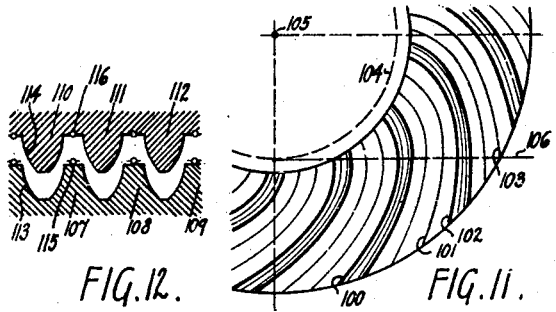
FIG. 12.
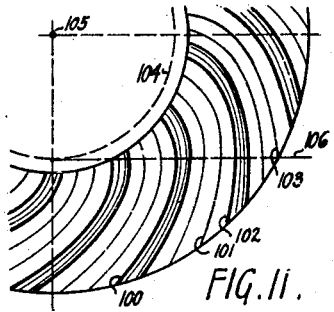
FIG. 11.
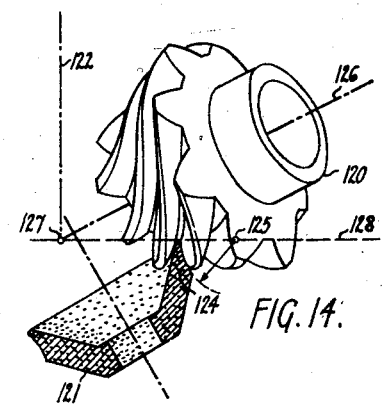
FIG. 14.
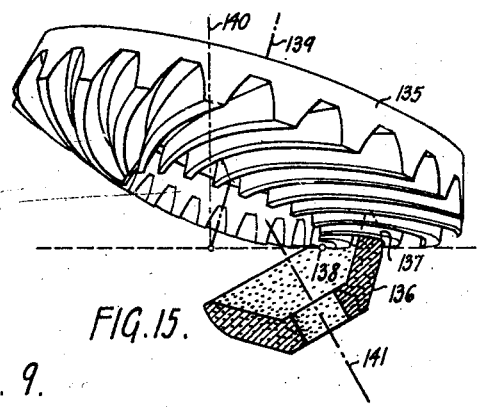
FIG. 15.
FIG. 9.
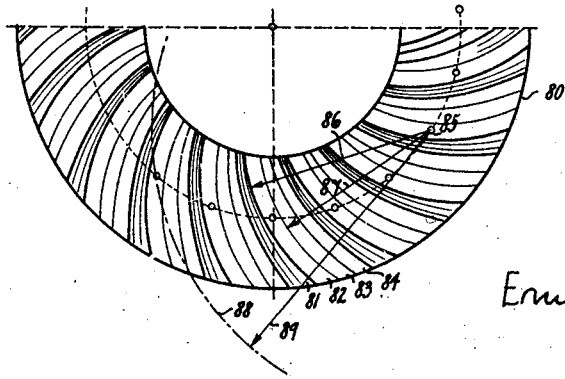
INVENTOR
Ernest Wildhaber Dec. 4, 1928.

E. WILDHABER

GEARING

Filed March 25, 1924  3 Sheets-Sheet 3

INVENTOR

Ernest Wildhaber

Patented Dec. 4, 1928.

1,694,027

UNITED STATES PATENT OFFICE.

ERNEST WILDHABER, OF BROOKLYN, NEW YORK, ASSIGNOR TO GLEASON WORKS, OF ROCHESTER, NEW YORK, A CORPORATION OF NEW YORK.

GEARING.

Application filed March 25, 1924. Serial No. 701,698.

My invention relates to the tooth shape of these types of gears, where the axes of two mate gears are contained in a single plane. Such gears are known as bevel gears, when the axes of two mate gears intersect, and as spur gears, when the two axes are parallel.

The present invention can be considered in part as a continuation of my application Serial Number 672,254 filed November 2nd 1923, which refers to helical gears only.

One object of my invention is to provide a pair of gears having improved tooth contact and improved wearing qualities.

Another object is to provide a pair of theoretically accurate gears having a close fitting tooth contact, which extends from the root to the tip of the teeth substantially at right angles to the direction of the teeth.

Another object is to provide a pair of bevel gears, in which one gear is provided with convex and substantially circular tooth profiles, and the other gear is provided with concave mate tooth profiles of substantially the same shape.

A further purpose is to provide a system of gears of convex tooth profile, and a system of mate gears of concave profile, the tooth profile being substantially the same on all gears.

Another object is to provide gears with such a tooth shape as may be accurately produced by a process known as hot rolling.

A further purpose is to provide a pair of gears having complementary and substantially circular tooth profiles centered on the respective pitch surfaces.

A still other purpose is to provide a pair of bevel gears having complementary profiles in a section at right angles to the direction of a tooth, mate profiles being substantially equal convex and concave circular arcs, with centers located on the pitch surfaces of the gears.

Figure 1:
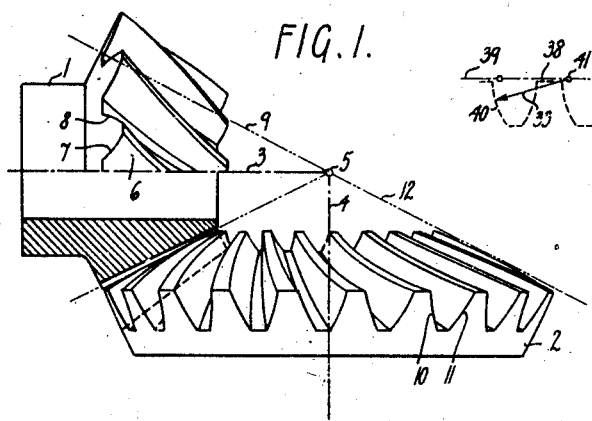
Figure 4:
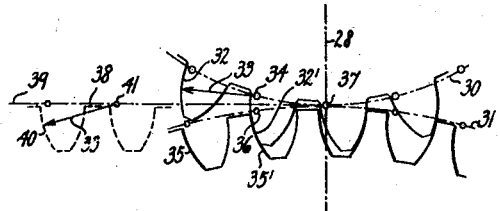
Figure 2:
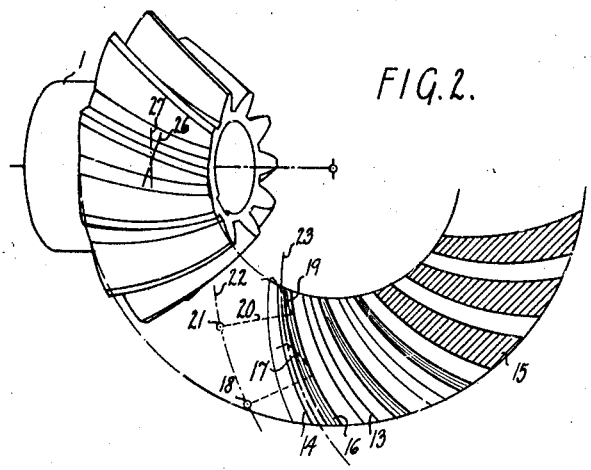
Figure 5:
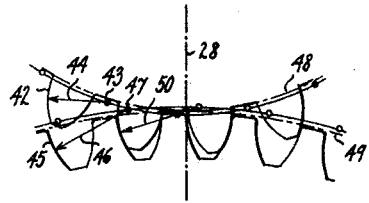
Figure 3:
Figure 6:
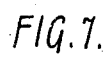
Figure 6:
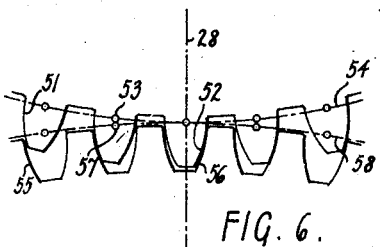
Figure 7:
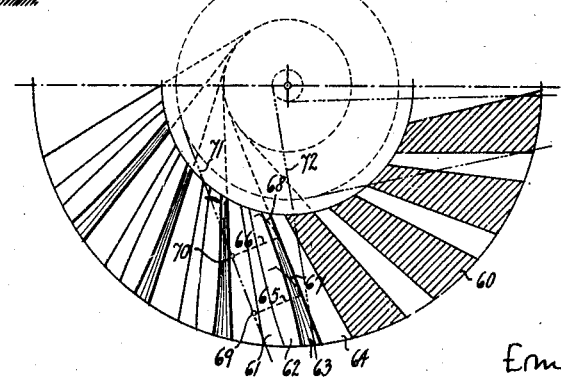
Figure 19:
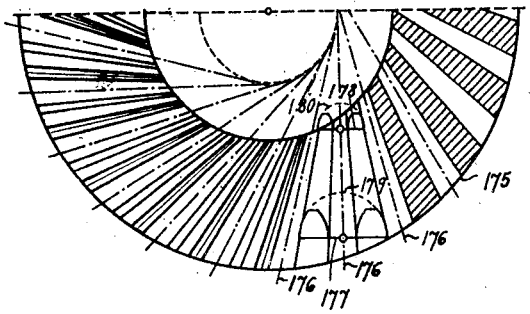
Figure 16:
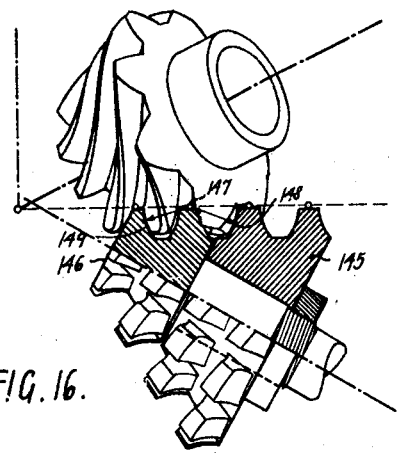
Figure 17:
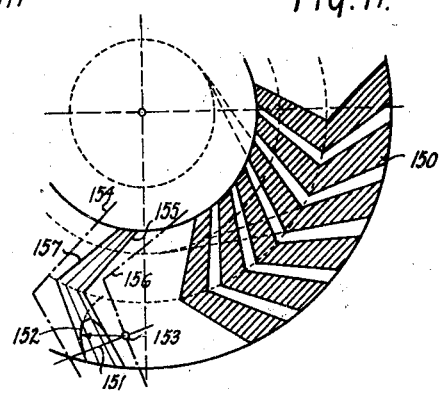
Figure 18:
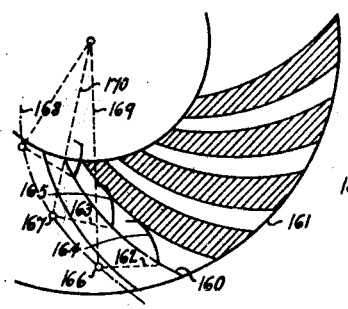
Figure 20:
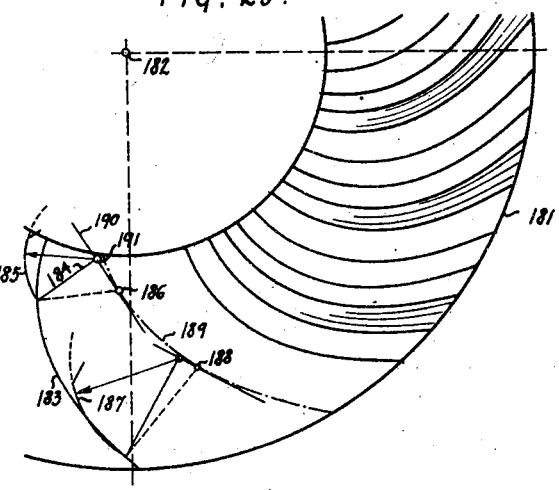

Embodiments of my invention are exemplified in the accompanying drawings, in which:

Fig. 1 is a side view of a pair of bevel gears constructed according to my invention. Fig. 2 is a plan view indicating a development of the pitch cone of the pinion shown in Fig. 1. Fig. 3 is a sectional view showing mate normal sections of a pair of gears formed according to my invention. Fig. 4, Fig. 5 and Fig. 6 are normal sections through mating teeth formed according to my invention, and illustrating several modifications of design. Fig. 7 is a plan view and partly a section of a basic crown gear having convex tooth profiles. Fig. 8 is a perspective view of a mate crown gear having concave tooth profiles, which correspond to the convex profiles shown in Fig. 7. Fig. 9 is a plan view of a crown gear with longitudinally circular teeth, having tooth sides formed according to my invention. Fig. 10 is a plan view of a basic rack with longitudinally circular teeth. Fig. 11 is a plan view of a basic crown gear, having teeth longitudinally curved along involutes. Fig. 12 is a section in the direction of line 106 of Fig. 11 through two complementary basic crown gears. Fig. 13 is a plan view of a bevel pinion in the process of being ground. Fig. 14 is a side view corresponding to Fig. 13, and partly a section along line 123 of Fig. 13. Fig. 15 is a view similar to Fig. 14, showing a mate gear in the process of being ground. Fig. 16 is a section along line 123 of Fig. 13, showing a milling cutter in place of the grinding wheel of Fig. 13 and Fig. 14. Fig. 17 is a section taken along the pitch plane of a crown gear with herringbone teeth, constructed according to my invention. Fig. 18 is a plan view and section of a crown gear illustrating another embodiment of my invention. Fig. 19 and Fig. 20 are plan views of basic crown gears, illustrating my invention in a broader aspect.

In Fig. 1 the numerals 1 and 2 denote two mate bevel gears constructed according to my invention, having axes 3 and 4, which intersect in apex 5. Gear 1 is provided with teeth 6, which contain working surfaces 7, 8 of convex profile, situated on the outside of pitch cone 9. Gear 2 is correspondingly provided with working surfaces 10 and 11 of concave profile, situated inside pitch cone 12.

A development of the pitch surface 9 of gear 1 is indicated in Fig. 2, which can also be considered as a plan view of a crown gear. At the left the teeth 13 and 14 of gear 1 are shown in a view, in development, whereas on the right the teeth 15 are shown in section, and are shadowed. The tooth side 16 is provided with a convex and substantially circular profile 17 indicated in dotted lines. It is shown turned down into the plane of development, while its natural position is in a perpendicular plane. Profile 17 has its center at 18, in the developed pitch surface of gear 1.

A further sectional profile is shown at 19, corresponding to a section 20, the center of profile 19 being at 21. The centers 18 and 21 of the various normal sections constitute a line 22, which may be called the center line of tooth side 16. The said normal sections are laid perpendicularly to center line 22, or approximately at right angles to the direction of tooth 14. It will be noted that center line 22 is outside of the longitudinal center line 23 of tooth 14.

Normal section 20 is further shown in Fig. 3, indicating in addition to profile 19 of gear 1 also profile 24 of the mate gear 2. Both profiles are circular arcs of substantially the same radius, one being convex and the other concave. During the mesh the centers 21 and 25 coincide, contact being made simultaneously on the whole length of the profiles.

According to the preferred embodiment of my invention a tooth side of a gear contains a substantially circular profile centered on the pitch surface of the gear.

As usual a tooth profile is here understood to be the profile of a tooth section, whose sectional plane contains a perpendicular with respect to the pitch surface of a gear. Prominent tooth profiles are the normal profiles and the circumferential profiles, corresponding to a section perpendicular to the direction of a tooth, and to a section in tangential direction respectively, a circumferential section through a pair of gears being perpendicular to the contact line of their pitch surfaces. Preferably either normal profiles or circumferential profiles are made circular arcs according to my invention. In both cases mate profiles of a pair of gears are exactly complementary on theoretically accurate gears, the radii of mate profiles being equal.

In pairs of usual gears the tooth profiles and the lines of contact are nearly at right angles. In gears formed according to my invention however a line of contact coincides substantially with either a normal or a circumferential tooth profile, so that mate gears fit each other along the very tooth profiles. I have found this to be a particularly close fit, which reduces surface stresses, decreases wear and increases the loading capacity of the teeth.

Moreover in gears formed according to my invention the tooth profile does not need to vary with the diameter. The tooth profile is here characteristic to, and the same on a whole system of gears. The crown gear of a system of bevel gears for instance may carry the same tooth profiles as any other bevel gear of whatever pitch angle. This peculiarity results in many advantages in making gears according to my invention.

A substantial advantage is realized in the process known as hot rolling. In this process a master gear is rolled on a heated blank in timed relation, at a ratio corresponding to the respective tooth numbers of master gear and blank.

For gears hitherto in use a tooth profile of the master gear is different from the corresponding tooth profile of the blank. The latter profile must therefore be produced in a moulding-generating operation. It tends to get badly distorted and also different on opposite tooth sides on account of the flowing of the material, and because the master gear covers a tooth profile of the blank successively, changing the parts covered immediately before.

Gears formed according to my invention however are produced rather in a copying operation than in a generating operation, because the tooth profile of the blank is already contained on the master gear, and is merely transmitted from the master gear to the blank. The moulding action is therefore minimized and acts merely on the teeth as a whole. Moreover the tooth profiles are covered on their whole length at once, so that there is no tendency to distortion.

The Figures 4–6 indicate normal tooth sections through pairs of gears made according to my invention. Such a normal section through a bevel gear is indicated at 26 in Fig. 2, the section being substantially at right angles to the direction of a tooth.

The sectional profiles of the different teeth as a rule change somewhat in size and shape with increasing distance from line 28, but are shown identical for convenience. In Fig. 4, 30 and 31 denote the sections through the pitch surfaces of two mate gears, and will be called pitch circles in the following. In the shown normal sections the tooth profiles 32 are convex circular arcs with radii 33 and centers 34. The mate profiles 35 are concave circular arcs of substantially the same radii and having centers at 36. The mathematical requirements of uniform motion, that is of an accurately constant ratio between two mate gears, are then fulfilled, as will be readily realized by those skilled in the art.

It will be noted that the centers 34 and 36 are situated on the pitch circles 30 and 31, that is on the pitch surfaces.

During the mesh two corresponding centers 34 and 36 coincide in the contact point 37 of the pitch circles 30 and 31. In Fig. 4 contact is made between profiles 32′ and 35′. The tooth contact extends substantially along a profile, that is it reaches directly from the bottom to the tip of a tooth. I have found that also in a direction at right angles to the mathematical line of contact, two mate teeth remain so close to each other that nearly surface contact is effected.

For comparison rack teeth or crown gear teeth 38 are shown in dotted lines at the left of Fig. 4. They correspond to a pitch line 39. The tooth profiles are circles 40 of the same radius 33 as profiles 35, having centers 41 likewise on the respective pitch line 39. There is no difference in the tooth profiles 35 and 40, while in all usual gears these profiles are different from each other.

Fig. 5 illustrates a modification of my invention. The convex tooth profiles 42 are made circular arcs of centers 43 and of a radius 44, which is slightly smaller than radius 46 of the concave tooth profiles 45. The arc centers 43 and 47 are preferably located somewhat outside of the respective pitch lines 48 and 49, at least on one of the two gears; and the location of the arc centers is preferably so chosen, that the main tooth pressure is about in the center of the tooth profiles, and directed along a suitably inclined line 50. A slight difference in the radii of mate profiles makes the gears less sensitive against errors in mounting or in making.

Fig. 6 indicates a special design of teeth formed according to my invention. The circular profiles 51 and 52 have a common center 53 located substantially on pitch line 54. Correspondingly the mate profiles 55 and 56 have a common center 57, located on pitch line 58. In other words the center line of the tooth side 51 coincides with the center line of tooth side 52. In several applications of my invention this brings with it certain manufacturing advantages.

The Figures 3–6 can also be considered as circumferential sections through mate teeth, instead of normal sections. A circumferential section of a bevel gear is indicated by line 27 in Fig. 2.

Fig. 7 shows the pitch plane of a crown gear, which contains teeth of convex circular profile. At the right the teeth are shown in shadowed sections 60, while they are shown in view at the left. The shown teeth of the crown gear are straight in longitudinal direction, but inclined with respect to a radius. They contain tooth sides 61, tips 62, tooth sides 63 and bottoms 64. Normal sections through tooth side 63 are shown at 65 and 66, turned down into the plane of the crown gear. The tooth profiles 67 and 68 of the said normal sections are circular arcs of equal radii, having centers at 69 and 70. The centers (69 and 70) of all normal sections through tooth side 63 constitute a center line 71, which in the present case is a straight line, parallel to the direction of the tooth side. Tooth side 63 can therefore be considered as a part of a cylindrical surface, which has its axis 71 situated in the pitch plane of the crown gear. Similarly the opposite tooth side 61 of the crown gear is a part of a cylindrical surface having an axis 72.

A mate crown gear 75 is shown in Fig. 8 in a perspective view. Its active tooth sides 76 and 77 are situated inside of its pitch plane 78, whereas the crown gear of Fig. 7 has its active tooth surfaces located on the outside of its pitch plane. The two crown gears match each other as exact counterparts, when put together with their axes coinciding, and the teeth of the one going into the spaces of the other.

In the drawings crown gears are shown merely for convenience, because they permit a simple picture, and because the shape of mate bevel gears may be readily determined from the shape of mate crown gears.

In pairs of bevel gears the circular tooth profiles are the same as on pairs of crown gears. The center lines of the tooth sides are situated on the pitch cones of the gears, and they correspond to one another as if printed from one pitch cone to the other. The point where two corresponding center lines touch each other is the center of the tooth profile, along which in the considered moment tooth contact takes place.

It is desirable to so select the pitch of the teeth and their spiral angles, that tooth contact starts on a new pair of teeth before the contact of a considered pair of teeth has come to an end, as well known to those skilled in the art. In the figures this has frequently not been complied with, in an endeavour to show the tooth design more clearly by selecting an excessively coarse pitch, that is an excessively small tooth number.

Fig. 9 is a plan view of a crown gear 80 which is provided with longitudinally circular teeth. The profile of the teeth, in a normal section, is supposed to be a convex circular arc, having its center on the pitch plane of the crown gear, as in Fig. 7. The teeth consist of an inner side 81, of a tooth bottom 82, of an outer side 83 and of a tip 84. In Fig. 9 both sides 81 and 83 of a tooth space are coaxial surfaces of revolution, having a common axis at 85, and having radii 86 and 87 at the bottom. Although this is a preferred form of design, it is not the only one possible. The two sides 81 and 83 may also be provided with independent axes.

The center line of side 81 is indicated at 88 as a circular arc of a radius 89 and a center 85.

The mate crown gear would be the exact counterpart of crown gear 80, and is not shown in the figures.

Fig. 10 illustrates an application of my invention to the spur type of gears. A rack 90 is provided with longitudinally circular teeth 91, consisting of an inner side 92, of a tip 93, of an outer side 94 and of a tooth bottom 95.

In the figure the sides 92 and 94 are shown as surfaces of revolution, side 94 having an axis 96 and a mean radius 97. The meridional profiles, or axial sections, of the sides 92 and 94 are supposed to be convex circular arcs, with centers on the pitch plane. 98 and 99 are the center lines of the sides 92 and 94 respectively.

The mate rack would be the exact counterpart of the shown rack, having concave circular tooth profiles. Mate gears similarly are provided with complementary convex and concave tooth profiles, as explained for bevel gears.

The crown gear shown in Fig. 11 is provided with teeth, which extend along involutes in longitudinal direction. The pitch lines 100, 101, 102, 103 of the teeth are involutes, corresponding to a base circle 104, which is concentric with the axis 105 of the crown gear.

As well known, involutes intersect any tangent 106 to the base circle 104 at right angles. Moreover involutes have a constant normal pitch, measured in the direction of said tangent 106. As indicated in Fig. 12, which is a section along tangent 106 of Fig. 11, all the teeth 107, 108, 109 are the same distance apart, and are identical in size at various distances from axis 105. The teeth 110, 111, 112 of the mate crown gear are exact counterparts of the teeth 107, 108, 109. The tooth profiles 113 and 114 are circular arcs of substantially equal radii, having centers 115 and 116 on the respective pitch plane.

A way of grinding such teeth is indicated in Fig. 13 and Fig. 14. Fig. 13 is a plan view of a bevel gear 120, which is in engagement with a grinding wheel 121, the view being taken in the direction of the axis 122 of the basic crown gear. Fig. 14 is a front elevational view corresponding to Fig. 13, and partly a section in the direction of base circle tangent 123 of Fig. 13. A grinding wheel 121, shown here as a cup wheel, is provided with a concave circular grinding profile 124, coinciding with a tooth profile of blank 120, and having its profile center at 125. The blank is mounted on an axis 126 which passes through apex 127 and which may be swivelled about axis 122 of the basic, but imaginary crown gear. The grinding wheel 121 is rotated on its axis, and in addition is advanced in the direction of tangent 123 (see Fig. 13). Axis 126 is swivelled about axis 122, and the blank simultaneously turned on its axis 126 at such a rate as to correspond to a rolling motion, in which the pitch cone of the blank rolls on the pitch plane 128 of the crown gear.

As the grinding wheel moves in the direction 123, the blank 120 is rolled for such an amount, that the contact line between its pitch cone and pitch plane 128 of the crown gear intersects line 123 in the center 125 of the grinding profile. Another position of this center is shown at 125' in Fig. 13. When the grinding wheel gets into the position as to have its profile center at 125', the axis 126 has been swivelled into position 126', always passing over the center of the grinding profile.

In this way a whole side surface of a tooth can be completely covered at every grinding stroke. The fact that this can be done and done theoretically correctly is particular to the gearing of my invention.

Fig. 15 is similar to Fig. 14 and shows a gear blank 135 being ground by a grinding wheel 136. Gear 135 is a mate to gear 120 of Fig. 13 and of Fig. 14. In consequence the grinding profile 137 is a circular arc of substantially the same radius as arc 124, having a center 138. Gear 135 may be ground in the same way as explained for gear 120. 139 denotes the axis of the gear, 140 the axis of the crown gear, about which axis the gear is swivelled, and 141 is the axis of the grinding wheel.

Fig. 16 indicates a way of simultaneously finishing two tooth sides of a blank. Fig. 16 is a view similar to Fig. 14 except for the tool. The tool is in the form of a hob, and may consist of two interlocking parts 145, 146. 147 is the common center of the profiles 148 and 149, along which the finishing cut takes place. Other cutting profiles of the hob serve merely for roughing. The hob may be used in the same way as described for the grinding wheels 121 and 136, the blank being rolled for such an amount, that its axis is always over the center 147 of the finishing profiles.

It will be noted that the shown hob thread is arranged in rings, having no lead, and that the outlined cutting process is a true milling operation, one pair of tooth sides being finished after the other. The process is in principle the same for milling and for grinding.

Spur and bevel gears formed according to my invention may also be produced in a hobbing process, the blank being indexed continuously. For bevel gears a tapered hob is used, which is provided with uniform lead. This is however not illustrated in the drawings, inasmuch as the only novelty consists in the shape of the tooth profiles, which has been already explained.

Fig. 17 indicates a crown gear with herringbone teeth 150, shown in a section along the pitch plane. A normal tooth section is shown at 151, revealing again a circular tooth profile 152, with a center 153. 154 is the center line of side 155, while 156 is the center line of tooth side 157. One way of producing herringbone bevel gears is by hot rolling, a master gear moulding a heated blank. The master gear may be made in two parts, one part with right hand spiral teeth, the other with left hand teeth.

Fig. 18 illustrates a modification of my invention. Sections through a tooth side 160 of a crown gear 161 are shown at 162 and 163. They reveal circular arcs 164 and 165, having centers 166 and 167. 168 is the center line of side 160. The sections 162 and 163 are not normal sections, as in the previous examples, but are circumferential sections with respect to center line 168. Section 162 is perpendicular to apex radius 169, and section 163 is perpendicular to radius 170. Mate gears of this type have complementary circular profiles in the said circumferential sections.

Whereas in the previous examples the radius of a circular profile was the same on the whole length of a tooth, the profile radius of the teeth shown in Fig. 19 varies along the teeth. The tooth sides of crown gear 175 are parts of conical surfaces, having their center lines 176 located substantially in the pitch plane of the crown gear. Normal tooth sections 177 and 178 show circular profiles 179 and 180 of diminishing radius.

In a still broader aspect my invention is shown in Fig. 20, where 181 is the pitch plane of a crown gear, having an axis 182. Curve 183 is the pitch line of a tooth side, which contains circular profiles of varying radii. Section 184 indicates such a circular profile 185, turned down into the pitch plane of the crown gear.

In the shown embodiment of my invention the perpendiculars to the tooth surface, at the various points of profile 185, intersect the pitch plane 181 in a single point 186. Similarly the tooth perpendiculars of other circular profiles, such as 187, intersect the pitch plane in a single point (188). The intersection points 186, 188, which correspond to the various circular profiles, constitute a line 189, which may be called the center line of a tooth side. It will be noted that any plane 184 of a circular tooth profile 185 is perpendicular to the tangent 190 of center line 189, and that the center 191 of the circular profile 185 is located in the intersection point of said tangent 190 with plane 184.

It will be understood that such changes and modifications may be made in my invention, as fall within the scope of the appended claims.

What I claim is:

1. A pair of gears, having angularly disposed axes and having teeth extending across the faces of said gears along lines inclined to the generatrices of the respective pitch surfaces, the tooth profiles of one gear being exclusively convex circular arcs, and the mate tooth profiles of the other gear of said pair being exclusively concave circular arcs of substantially the same radius.

2. A pair of gears, having angularly disposed axes and having teeth extending across the faces of said gears along lines inclined to the straight generatrices of the respective pitch surfaces, the pinion having a convex and substantially circular tooth profile in a section which is perpendicular to its pitch surface, the center of said tooth profile being approximately situated in the pitch surface, the mate gear having a concave mate tooth profile which is substantially a circular arc of the same radius.

3. A pair of gears, having angularly disposed axes and having teeth extending across the faces of said gears along lines inclined to the generatrices of the respective pitch surfaces, the pinion having a convex and substantially circular tooth profile in a section laid perpendicularly to the direction of a tooth, the center of said profile being situated on the pitch surface of said pinion, the mate gear having a concave mate tooth profile, which is substantially a circular arc of the same radius, said arc having its center on the pitch surface of the gear.

4. A pair of bevel gears, having teeth extending across the faces of said gears along lines inclined to the generatrices of the respective pitch surfaces, said gears having active tooth surfaces which are of convex and concave profile respectively, and complementary, the tooth perpendiculars along a profile intersecting the respective pitch surface substantially in a single point.

5. A pair of bevel gears having teeth extending across their faces along lines inclined to the generatrices of their respective pitch surfaces, said gears having complementary exclusively circular convex and concave tooth profiles respectively, a tooth side having a center line situated on the respective pitch surface, the center lines of mate tooth sides coinciding in development.

6. A pair of bevel gears having circular and substantially equal convex and concave tooth profiles respectively, a tooth side having a center line on the respective pitch surface, said center line being different from the longitudinal center line of the tooth, of which said tooth side is a part.

7. A pair of bevel gears, having teeth with substantially equal and circular convex and concave mate profiles, a tooth side having a center line on the pitch surface of its gear, at a larger distance from said tooth side than the longitudinal center line of the tooth, of which said tooth side is a part.

8. A pair of spiral bevel gears having complementary and substantially equal tooth profiles, mate profiles being exclusively convex and concave circular arcs centered on the pitch surface, two tooth sides of a gear having a common center line on the pitch surface.

9. A pair of gears, having angularly disposed axes and having teeth extending across the faces of said gears along lines inclined to the straight generatrices of the respective pitch surfaces, one of said gears having convex tooth profiles and the other of said gears having concave tooth profiles, said profiles being substantially circular arcs and being substantially the same all along a tooth side.

10. A pair of gears having angularly disposed axes and having teeth extending across their faces along lines inclined to the generatrices of their respective pitch surfaces, one of said gears having a tooth profile which is convex in a section laid perpendicular to the direction of a tooth and the other of said gears having a tooth profile which is concave in a section laid perpendicular to the direction of a tooth, the mate profiles being substantially equal circular arcs and each profile being the same all along a tooth side.

11. A pair of gears, having angularly disposed axes and having teeth extending across the faces of said gears along lines inclined to the generatrices of the respective pitch surfaces, said gears having complementary tooth profiles in a section laid perpendicularly to the direction of a tooth, mate profiles being convex and concave circular arcs, the radii of said arcs being larger than one half of the normal pitch.

12. A pair of spiral bevel gears having complementary and substantially equal tooth profiles in a normal section, mate profiles being a convex and a concave circular arc centered on the respective pitch surface, the radius of said tooth profiles being constant all along a tooth side, two distant tooth sides of a gear having a common center line located on the pitch surface.

13. A pair of spiral bevel gears having complementary and substantially equal tooth profiles, mate profiles being exclusively a convex and a concave circular arc centered on the respective pitch surfaces, the radius of said tooth profiles being constant all along a tooth side, two tooth sides of a gear having a common center line.

14. A bevel gear having teeth extending across its face along lines inclined to the generatrices of its pitch surface, said gear having side tooth surfaces whose working portions are in the form of single circular arcs whose centers are located substantially on the pitch surface of the gear.

15. A bevel gear having teeth extending across its face along lines inclined to the generatrices of its pitch surface, said gear having side tooth surfaces whose working portions are in the form of single circular arcs whose centers lie outside the teeth and are located substantially on the pitch surface of the gear.

16. A pair of gears having angularly disposed axes and provided with teeth which extend across their faces along lines inclined to the generatrices of their respective pitch surfaces, one of said gears being provided with active tooth surfaces which are exclusively convex circular arcs and the other of said gears having active tooth surfaces which are exclusively concave circular arcs.

17. A bevel gear having teeth extending across its face along lines inclined to the generatrices of its pitch surface, said gear having teeth whose active tooth surfaces have profiles in the form of single circular arcs the centers of the profiles of a tooth lying on opposite sides of said tooth and being located substantially on the pitch surface of said gear.

18. A bevel gear having teeth extending across its face along lines inclined to the generatrices of its pitch surface, said gear having teeth whose active tooth surfaces have profiles in the form of single circular arcs, the centers of the profiles of a tooth lying on opposite sides of said tooth and outside of said tooth and being located substantially on the pitch surface of said gear.

19. A pair of gears having angularly disposed axes and provided with teeth which extend across their faces along lines inclined to the generatrices of their respective pitch surfaces, said gears having teeth with active tooth surfaces the profiles of which are single circular arcs, mate profiles having substantially the same radius.

20. A pair of gears having angularly disposed axes and provided with teeth which extend across their faces along lines inclined to the generatrices of their respective pitch surfaces, the teeth of said gears having active tooth surfaces the profiles of which are single circular arcs the centers of which are located outside of the respective teeth, mate tooth profiles having substantially the same radius.

21. A pair of gears having angularly disposed axes and provided with teeth which extend across their faces along lines inclined to the generatrices of their respective pitch surfaces, one of said gears having active tooth surfaces which are wholly convex, and the other of said gears having active tooth surfaces which are wholly concave, said gears being so proportioned that tooth contact travels over a tooth profile during a rotation of the gears of less than one half the pitch.

22. A pair of gears having angularly disposed axes and provided with teeth which extend across their faces along lines inclined to the generatrices of their respective pitch surface, one of said gears having active tooth surfaces which are exclusively convex circular arcs and the other of said gears having active tooth surfaces which are exclusively concave circular arcs, said gears being so proportioned that the tooth contact travels over a tooth profile during a rotation of the gears of less than one half the pitch.

23. A pair of gears having angularly disposed axes and provided with teeth which extend across their faces along lines inclined to the generatrices of their respective pitch surfaces, one of said gears having active tooth surfaces which are wholly convex and the other of said gears having active tooth surfaces which are wholly concave, the active tooth surfaces of one gear lying outside the pitch surface of said gear and the active tooth surfaces of the other gear lying within its pitch surface, the tooth surfaces of said gears being complementary.

24. A pair of gears having angularly disposed axes and provided with teeth which extend across their faces along lines inclined to the generatrices of their respective pitch surfaces, one of said gears having active tooth surfaces whose profiles are exclusively convex circular arcs and the other of said gears having active tooth surfaces whose profiles are exclusively concave circular arcs, the centers of the tooth surfaces of each gear being located outside of the respective teeth of such gear.

25. A pair of gears having angularly disposed axes and provided with teeth which extend across their faces along lines inclined to the generatrices of their respective pitch surfaces, each of said gears having active tooth surfaces which are of circular profile of constant radius all along the length of a tooth side.

26. A pair of gears having angularly disposed axes and provided with teeth which extend across their faces along lines inclined to the generatrices of their respective pitch surfaces, each of said gears being provided with active tooth surfaces whose profiles are single circular arcs, the active tooth surfaces of one gear being situated outside the pitch surface of said gear and the active tooth surfaces of the other gear being situated inside the pitch surface of said gear.

27. A pair of gears having angularly disposed axes and provided with teeth which extend across their faces along lines inclined to the generatrices of their respective pitch surfaces, said gears having complementary tooth profiles, mate profiles being respectively convex and concave circular arcs of substantially equal radii whose centers lie on the pitch surfaces of the respective gears.

28. A pair of gears having angularly disposed axes and provided with teeth which extend across their faces along lines inclined to the generatrices of their respective pitch surfaces, said gears having complementary tooth profiles, mate profiles being respectively convex and concave circular arcs the centers of which lie on the respective pitch surfaces of the gears, the profiles being identical all along a tooth side.

29. A pair of gears having angularly disposed axes and provided with teeth which extend across their faces along lines inclined to the generatrices of their respective pitch surfaces, said gears having complementary tooth profiles, mate profiles being respectively convex and concave circular arcs of equal radii whose centers lie on the respective pitch surfaces of the gears, profiles of the teeth of each gear being identical all along a tooth side.

In testimony whereof, I hereto affix my signature.

ERNEST WILDHABER.